US010679427B1

(12) United States Patent
Hariton (10) Patent No.: US 10,679,427 B1
(45) Date of Patent: *Jun. 9, 2020

(54) SYSTEMS, METHODS, AND STORAGE MEDIA FOR CONVEYING VIRTUAL CONTENT IN AN AUGMENTED REALITY ENVIRONMENT

(71) Applicant: Nicholas T. Hariton, Sherman Oaks, CA (US)

(72) Inventor: Nicholas T. Hariton, Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,300

(22) Filed: Jan. 29, 2020

Related U.S. Application Data

(63) Continuation of application No. 16/399,626, filed on Apr. 30, 2019, now Pat. No. 10,586,396.

(51) Int. Cl.
*G06T 19/00* (2011.01)
*G06F 3/0482* (2013.01)
*G06F 3/0484* (2013.01)

(52) U.S. Cl.
CPC .......... *G06T 19/006* (2013.01); *G06F 3/0482* (2013.01); *G06F 3/0484* (2013.01); *G06T 2200/24* (2013.01); *G06T 2219/024* (2013.01)

(58) Field of Classification Search
CPC ............. G06T 19/006; G06T 2219/024; G06T 2200/24; G06F 3/0482; G06F 3/0484
See application file for complete search history.

(56) References Cited

U.S. PATENT DOCUMENTS 7,274,380 B2 9/2007 Navab
7,373,377 B2 5/2008 Altieri
(Continued)

FOREIGN PATENT DOCUMENTS

WO 2014147686 9/2014
WO 2018055459 3/2018

OTHER PUBLICATIONS

Caroly Giardina, New Venture Aims to Creat Al-Driven Digital "Copies" of Hollywood Stars; published Jun. 28, 2017; [retrieved Sep. 18, 2017] retrieved from the Internet http://www.hollywoodreporter.com/behind-screen/new-venture-aims-create-ai-driven-digital-copies-hollywood-stars-1017298 (2 pages).
(Continued)

*Primary Examiner* — Michael Le
(74) *Attorney, Agent, or Firm* — Esplin & Associates, PC (57) ABSTRACT

Systems and methods for conveying virtual content in an augmented reality environment comprising images of virtual content superimposed over physical objects and/or physical surroundings visible within a field of view of a user as if the images of the virtual content were present in the real world. Exemplary implementations may: obtain user information for a user associated with a presentation device physically present at a location of the system; compare the user information with the accessibility criteria for the virtual content to determine whether any portions of the virtual content are to be presented to the user based on the accessibility criteria and the user information for the user; and facilitate presentation of the virtual content to the user via presentation device of user based on the virtual content information, the field of view, and the correlations between the multiple linkage points and the reference frame of the virtual content.

16 Claims, 4 Drawing Sheets

(56) References Cited

U.S. PATENT DOCUMENTS

| | | |
|---|---|---|
| 7,774,027 B2 | 8/2010 | Parikh |
| 8,139,067 B2 | 3/2012 | Anguelov |
| 8,228,325 B2 | 7/2012 | Barbaro Altieri |
| 8,275,590 B2 | 9/2012 | Szymczyk |
| 8,451,266 B2 | 5/2013 | Hertenstein |
| 8,458,028 B2 | 6/2013 | Altieri |
| 8,462,198 B2 | 6/2013 | Lin |
| 8,473,835 B2 | 6/2013 | Hariton |
| 8,847,953 B1 | 9/2014 | Cho |
| 9,001,118 B2 | 4/2015 | Molyneaux |
| 9,041,622 B2 | 5/2015 | McCulloch |
| 9,230,367 B2 | 1/2016 | Stroila |
| 9,251,626 B2 | 2/2016 | Wang |
| 9,323,325 B2 | 4/2016 | Perez |
| 9,324,318 B1 | 4/2016 | Bunn |
| 9,345,957 B2 | 5/2016 | Geisner |
| 9,354,702 B2 | 5/2016 | Mullins |
| 9,374,788 B2 | 6/2016 | Singamsetti |
| 9,400,593 B2 | 7/2016 | Hariton |
| 9,792,584 B2 | 10/2017 | Hariton |
| 10,102,659 B1 | 10/2018 | Hariton |
| 10,105,601 B1 | 10/2018 | Hariton |
| 10,198,871 B1 | 2/2019 | Hariton |
| 10,565,767 B2 | 2/2020 | Hariton |
| 2008/0284777 A1* | 11/2008 | Altieri ............... G06Q 30/02 345/418 |
| 2011/0018903 A1 | 1/2011 | Lapstun |
| 2011/0292076 A1 | 12/2011 | Wither |
| 2012/0001938 A1 | 1/2012 | Sandberg |
| 2012/0075430 A1 | 3/2012 | Ito |
| 2012/0077584 A1* | 3/2012 | Sarmenta ............ A63F 13/69 463/31 |
| 2012/0113223 A1 | 5/2012 | Hilliges |
| 2012/0122570 A1 | 5/2012 | Baronoff |
| 2012/0209714 A1* | 8/2012 | Douglas ............. G06Q 30/02 705/14.58 |
| 2012/0218263 A1 | 8/2012 | Meier |
| 2013/0083173 A1 | 4/2013 | Geisner |
| 2013/0201215 A1* | 8/2013 | Martellaro .......... G09G 5/00 345/633 |
| 2013/0278635 A1* | 10/2013 | Maggiore ........... G06T 19/006 345/633 |
| 2013/0326364 A1 | 12/2013 | Latta |
| 2013/0342572 A1 | 12/2013 | Poulos |
| 2014/0035901 A1 | 2/2014 | Chen |
| 2014/0091984 A1 | 4/2014 | Ashbrook |
| 2014/0248950 A1 | 9/2014 | Tosas Bautista |
| 2014/0368537 A1 | 12/2014 | Salter |
| 2015/0050994 A1 | 2/2015 | Mangold |
| 2015/0235423 A1 | 8/2015 | Tobita |
| 2015/0346722 A1 | 12/2015 | Herz |
| 2015/0356781 A1 | 12/2015 | Miller |
| 2015/0371447 A1 | 12/2015 | Yasutake |
| 2016/0110922 A1 | 4/2016 | Haring |
| 2016/0179455 A1* | 6/2016 | Liu ..................... G09G 5/005 345/2.2 |
| 2016/0187654 A1 | 6/2016 | Border |
| 2016/0203586 A1 | 7/2016 | Chang |
| 2016/0210780 A1 | 7/2016 | Paulovich |
| 2016/0314716 A1 | 10/2016 | Grubbs |
| 2017/0092002 A1 | 3/2017 | Mullins |
| 2017/0337858 A1 | 11/2017 | Vartanian |
| 2018/0018825 A1 | 1/2018 | Kim |
| 2018/0096507 A1* | 4/2018 | Valdivia ............. G06T 11/60 |
| 2018/0126620 A1 | 5/2018 | Talgorn |
| 2018/0201370 A1 | 7/2018 | Yang |
| 2019/0087995 A1 | 3/2019 | Hariton |
| 2019/0126149 A1 | 5/2019 | Hariton |
| 2019/0251720 A1 | 8/2019 | Hariton |
| 2019/0333277 A1 | 10/2019 | Hariton |

OTHER PUBLICATIONS

David Kariuki, 7 firms with face tracking tech for better VR avatars, Hypergrid Business; Nov. 20, 2016, retrieved from the Internet http://www.hypergridbusiness.com/2016/11/ai-emotion-and-facial-tracking-to-help-make-vr-avatars-more-realistic/ (16 pages).

Josh Constine, Augmented Reality for Trying on Makeup Is a Booming Business Posted Jan 19, 2016 by Josh Constine (@joshconstine)—TechCrunch, retrieved from the Internet https://techcrunch.com/2016/01/19/facial-precognition/ (9 pages).

Kato, et al., Marker Tracking and HMD Calibration for a Video-based Augmented Reality Conferencing System, in Proceedings of the 2nd International Workshop on Augmented Reality (IWAR 99). Oct. 1999, [retrieved Dec. 7, 2009] retrieved from the Internet<http://www.hitl.washington.edu/artoolkit/Papers/IWAR99.kato. pdf> (10 pages).

Mashalkar, et al., Personalized Animatable Avatars from Depth Data, Joint Virtual Reality Conference of EGVE—EuroVR (2013), [retrieved Sep. 18, 2017] retrieved from the Internet https://www.cse.iitb.ac.in/~paragc/pubs/papers/paper_jvrc2013.pdf (8 pages).

Mindshow promotional video, Mindshow Official Trailer—Create Animated Movies in Virtual Reality, YouTube, Published Apr. 14, 2017 [retrieved Sep. 18, 2017] retrieved from the Internet https://www.youtube.com/watch?v=UCVwx_vNe8U, and https://www.youtube.com/watch?v=2p9Cx4iX47E (4 pages).

Mindshow Webpage, About | Mindshow, [retrieved Sep. 18, 2017] retrieved from the Internet https://mindshow.com/about/ (6 pages).

Mindshow Webpage, How it Works, [retrieved Sep. 18, 2017] retrieved from the Internet https://mindshow.com/#how-it-works (4 pages).

Neal Stephenson, Snow Crash; New York : Del Rey, 1992, (pp. 44-50, 66, 70, 76, 79, 562, and 563).

R. Schuler, "How Does the Internet work," published 2002, downloaded from https://web.stanford.edu/class/msande91si/www-spr04/readings/week1/InternetWhite paper.htm (Year: 2002); 5 pages.

Rekimoto, et al., CyberCode: Designing Augmented Reality Environments with Visual Tags, Interaction Laboratory, Sony Computer Science Laboratories, Inc. Mar. 14, 2013, retrieved from the Internet http://citeseerx.ist.psu.edu/viewdoc/download?doi=10.1.1.37.126 &rep=rep1&type=pd f (10 pages).

Woodrow Barfield, Fundamentals of Wearable Computers and Augmented Reality, Second Edition (p. IX). CRC Press. Kindle Edition. Chapel Hill, North Carolina, Jul. 29, 2015, (pp. 59, 60, 195, 196, 227).

\* cited by examiner

SYSTEMS, METHODS, AND STORAGE MEDIA FOR CONVEYING VIRTUAL CONTENT IN AN AUGMENTED REALITY ENVIRONMENT

FIELD OF THE DISCLOSURE

The present disclosure relates to systems, methods, and storage media for conveying virtual content in an augmented reality environment comprising images of virtual content superimposed over physical objects and/or physical surroundings visible within a field of view of a user as if the images of the virtual content were present in the real world.

BACKGROUND

Augmented reality environments may be used to present virtual content to users as if it were present in the real world.

SUMMARY

One aspect of the present disclosure relates to a system configured for conveying virtual content in an augmented reality environment. The augmented reality environment may comprise of images of virtual content superimposed over physical objects and/or physical surroundings visible within a field of view of a user as if the images of the virtual content were present in the real world. The augmented reality environment may include the physical objects and/or the physical surroundings visible within the field of view of the user and images of virtual content presented in conjunction with the physical objects and/or the physical surroundings. The system may include one or more hardware processors configured by machine-readable instructions.

Electronic storage media may be configured to store virtual content information defining virtual content correlations between multiple linkage points and a reference frame of the virtual content. Relative positions of the multiple linkage points in the real world may define the reference frame with respect to the real world. The electronic storage media may be configured to store accessibility criteria for the virtual content. The processor(s) may be configured to obtain user information for a user associated with a presentation device physically present at a location of the system. The processor(s) may be configured to compare the user information with the accessibility criteria for the virtual content. The comparison may determine whether any portions of the virtual content are to be presented to the user based on the accessibility criteria and the user information for the user. The processor(s) may be configured to facilitate presentation of the virtual content to the user via the presentation device of the user. Facilitation of presentation may be based on the virtual content information, a field of view of the user, the correlation between the multiple linkage points, and the reference frame of the virtual content.

Another aspect of the present disclosure relates to a method for conveying virtual content in an augmented reality environment. The augmented reality environment may comprise images of virtual content superimposed over physical objects and/or physical surroundings visible within a field of view of a user as if the images of the virtual content were present in the real world. The augmented reality environment may include the physical objects and/or the physical surroundings visible within the field of view of the user and images of virtual content presented in conjunction with the physical objects and/or the physical surroundings. The method may include obtaining user information for a user associated with a presentation device physically present at a location of the system. The method may include comparing the user information with the accessibility criteria for the virtual content. The comparison may determine whether any portions of virtual content are to be presented to the user based on the accessibility criteria and the user information for the user. The virtual content may be defined by virtual content information. The virtual content information may define virtual content correlations between multiple linkage points and a reference frame of the virtual content. Relative positions of the multiple linkage points in the real world may define the reference frame with respect to the real world. The virtual content information may define accessibility criteria for the virtual content. The method may include facilitating presentation of the virtual content to the user via the presentation device of the user. Facilitation of presentation may be based on the virtual content information, a field of view of the user, the correlation between the multiple linkage points, and the reference frame of the virtual content.

Yet another aspect of the present disclosure relates to a non-transient computer-readable storage medium having instructions embodied thereon, the instructions being executable by one or more processors to perform a method for conveying virtual content in an augmented reality environment comprising images of virtual content superimposed over physical objects and/or physical surroundings visible within a field of view of a user as if the images of the virtual content were present in the real world. The augmented reality environment may include the physical objects and/or the physical surroundings visible within the field of view of the user and images of virtual content presented in conjunction with the physical objects and/or the physical surroundings. The method may include obtaining user information for a user associated with a presentation device physically present at a location of the system. The method may include comparing the user information with the accessibility criteria for the virtual content. The comparison may determine whether any portions of virtual content are to be presented to the user based on the accessibility criteria and the user information for the user. The virtual content may be defined by virtual content information. The virtual content information may define virtual content correlations between multiple linkage points and a reference frame of the virtual content. Relative positions of the multiple linkage points in the real world may define the reference frame with respect to the real world. The virtual content information may define accessibility criteria for the virtual content. The method may include facilitating presentation of the virtual content to the user via the presentation device of the user. Facilitation of presentation may be based on the virtual content information, a field of view of the user, the correlation between the multiple linkage points, and the reference frame of the virtual content.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form

DETAILED DESCRIPTION

This disclosure relates to systems and methods for conveying virtual content based on individual users and accessibility criteria of the virtual content, in accordance with one or more implementations. An augmented reality environment may include views of images forming virtual content superimposed over views of the real world. Virtual content may be presented to the individual user based on user information that is associated with the individual user. Virtual content may comprise one or more virtual content items able to be depicted in an augmented reality environment based on one or more reference frames. As used herein, the term "augmented reality environment" may refer to a simulated environment that includes the visual synthesis and/or combination of both (i) visible physical objects and/or physical surroundings, and (ii) visual virtual content presented in conjunction with the visible physical objects and/or physical surroundings to visually augment the visible physical objects and/or physical surroundings. The visual virtual content to be presented within a given physical environment (e.g., the visible physical objects and/or physical surroundings at a given location) may be referred to as a "virtual environment". In some implementations, virtual content may be superimposed over a physical object (or objects) to replace such physical object(s) in the augmented environment. Descriptions herein (such as the forgoing) describing visual augmentation of a physical environment within an augmented reality environment should not be read as precluding other forms of augmentation (e.g., audio, haptic, etc.). Additionally, the virtual content may include accessibility criteria in which the user information is compared to for determination of access to the virtual content. For example, virtual content items may be presented to a specific demographic, based on preference, and/or based on subscriptions to virtual content. A presentation device may provide information to a user (or a device of a user) defining virtual content and a correlation between the linkage points and a reference frame of the virtual content. When presented by a presentation device, the virtual content may be presented based on the reference frame of the virtual content correlated to the real world by virtue of the position of the linkage points in the real world.

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

Exemplary System Architecture

Figure 1:
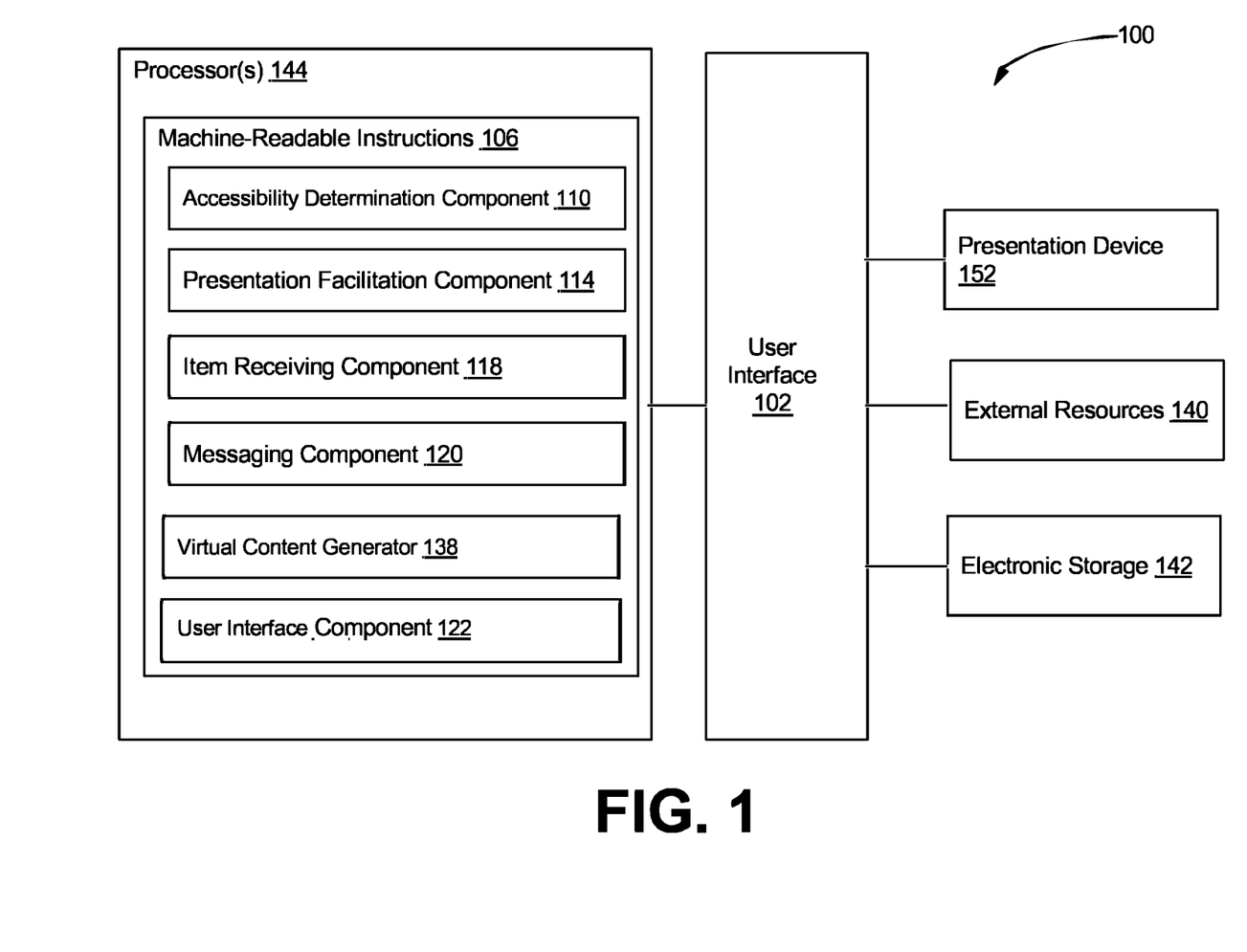
FIG. 1 illustrates a system configured for conveying virtual content in an augmented reality environment comprising images of virtual content superimposed over physical objects and/or physical surroundings visible within a field of view of a user as if the images of the virtual content were present in the real world, wherein the augmented reality environment includes the physical objects and/or the physical surroundings visible within the field of view of the user and images of virtual content presented in conjunction with the physical objects and/or the physical surroundings, in accordance with one or more implementations.

FIG. 1 illustrates a system 100 configured for conveying virtual content in an augmented reality environment comprising images of virtual content superimposed over physical objects and/or physical surroundings visible within a field of view of a user as if the images of the virtual content were present in the real world. The augmented reality environment includes the physical objects and/or the physical surroundings visible within the field of view of the user and images of virtual content presented in conjunction with the physical objects and/or the physical surroundings, in accordance with one or more implementations. In some implementations, system 100 may include one or more processor(s) 144, user interface 102, electronic storage 142, presentation device 152 and/or, other components.

Processor(s) 144 may be configured to provide information processing capabilities in system 100. As such, processor(s) 144 may include one or more of a digital processor, an analog processor, a digital circuit designed to process information, an analog circuit designed to process information, a state machine, and/or other mechanisms for electronically processing information.

Processor(s) 144 may be configured to execute one or more machine-readable instructions 106. Machine-readable instructions 106 may include one or more instruction components. The instruction components may include computer program components. The instruction components may include one or more of accessibility determination component 110, presentation facilitation component 114, item receiving component 118, messaging component 120, virtual content generator 138, user interface component 122, and/or other instruction components.

Presentation device 152 may comprise any device capable of displaying virtual content in an augmented reality environment comprising images of virtual content superimposed over real-time view of physical objects and/or physical surroundings visible within a field of view of a user as if the images of the virtual content were present in the real world. As such, presentation device 152 may comprise any device that includes and/or is communicatively coupled to an image capturing device (e.g., a camera and/or any other device that includes an imaging sensor) that may be used to capture a view of the real-world environment.

In various implementations, presentation device 152 may comprise a smartphone, a tablet, a computer, a wearable device (e.g., a headset, a visor, glasses, contact lenses, and/or any other wearable device), a monitor, a projector, and/or any other device configured to present views of virtual content in an augmented reality environment. In various implementations, presentation device 152 may include or be associated with one or more speakers for playing one or more sounds associated with a virtual content object. In some implementations, presentation device 152 may be arranged on, and/or may comprise part of, a headset (not shown in FIG. 1). When headset is installed on a user's head, the user's gaze may be directed towards presentation device 152 (or at least a display of presentation device 152) to view content presented by presentation device 152.

A display of presentation device 152 may include one or more of screen, a set of screens, a touchscreen, a monitor, a headset (e.g., a head-mounted display, glasses, goggles), contact lenses, and/or other displays. In some implementations, a display may include one or more of a transparent, semi-transparent, reflective, and/or semi-reflective display component, such as a visor, glasses, and/or contact lenses. Images of virtual content may be presented on the display component such that the user may view the images presented on the display component as well as the real-world through the display component. The virtual content may be perceived as being present in the real world. Such a configuration may provide an interactive space comprising an augmented reality environment. By way of non-limiting illustration, presentation device 152 may comprise an AR headset.

Virtual content information may be stored in electronic storage 142. Virtual content information may define virtual content correlations between multiple linkage points and a reference frame of the virtual content. Relative positions of the multiple linkage points in the real world may define the reference frame with respect to the real world. The arrangement of linkage points may define the position of the linkage points in relation to one another. In other words, the arrangement of the linkage points may define the relative position of each of the linkage points. The linkage points may comprise markers, transponders, stitching points, and/or other identified points.

In various implementations, virtual content information may define a correlation between one or more linkage points and one or more points associated with virtual content. For example, one or more points defining a virtual content item (and its reference frame) in three-dimensional space may be correlated to one or more linkage points of a living entity. Therefore, a reference frame for virtual content may be anchored to multiple linkage points simultaneously.

In some implementations, the correlation between the reference frame of the virtual content and the arrangement of the linkage points may be modified and/or updated, for example, as described in U.S. patent application Ser. No. 15/707,854 entitled "SYSTEMS AND METHODS FOR UTILIZING A DEVICE AS A MARKER FOR AUGMENTED REALITY CONTENT", the disclosure of which is hereby incorporated by reference in its entirety herein.

Virtual content information may define accessibility criteria for the virtual content. The accessibility criteria may define preferences associated with displaying individual virtual content items of the one or more virtual content items and/or conditions that must be satisfied to display the individual virtual content items of the one or more virtual content items. Conditions that must be satisfied may include a specific physical proximity, geo-location, specific geo-location at a specific time, values of user parameters, and/or other conditions. That is, virtual content information may define virtual content items to be displayed when, for example, a specific presentation device associated with a user is in proximity of a store. In some implementations, the accessibility criteria may indicate a subscription required to access the virtual content. Subscriptions may indicate the user agrees to receive virtual content, view virtual content, and/or participate in groups, or the like. Subscriptions may require advanced payments or may be free of charge.

The virtual content information may define characteristics of the virtual content. Virtual content may include one or more virtual content items. Each virtual content item may be associated with one or more specific users, living entities, structures, or objects visible within a field of view of a user. A virtual content item may comprise visual or non-visual virtual content to be perceived in an augmented reality environment. The characteristics may include, by way of non-limiting example, one or more of a visual appearance of the virtual content, one or more actions of the virtual content, textual and/or audible content of the virtual content, customizable features of the virtual content, properties of the virtual content, and/or other characteristics. The one or more actions of the virtual content may include flashing, spinning, bouncing, scrolling, jumping, flipping, kicking, dancing, running, walking, three-dimensional (3D) live action (e.g., concert, conferences, sporting events, games of chance, contests, games, adult entertainments, public speeches, etc. whether in real-time or time shifted), animation, and/or other actions. The properties of the virtual content may relate to the visual appearance, textual content, audible content, and/or actions of the virtual content. The properties may include color, shape, overall size, relative size to another virtual content item, transparency, font, font size, volume level, sound effects, and/or other properties. Customizable features of the virtual content may include the visual appearance, the one or more actions, textual content, audible content, properties, access time, and/or other customizable features. The access time may indicate that the virtual content is available for a limited time, specific period time, while supplies last, and/or other time periods.

Accessibility determination component 110 may be configured to obtain user information for a user associated with presentation device 152 physically present at a location of the system. The user information may identify the user associated with presentation device 152. The user information may be defined by values of user parameters. The user parameters may include passwords, pin numbers, security questions (e.g., riddles), biometric information, radio frequency identification, demographic information, account information, activity information, and/or other user information. The biometric information may include fingerprints, eye retina and iris scans, hand scans, voice, signature, and/or other biometric information. The demographic information may include age, gender, occupation, and/or other demographic information. By way of non-limiting example, the occupation may include one or more of certifications (e.g., emergency responders, aviation, installation, etc.), rankings (e.g., military, police, fire, governmental, etc.) and/or clearances (e.g., security). The user information for the user may be defined and/or modified by the user.

The account information may include one or more of subscriptions, memberships, groups, platforms, preferences, usage, contact information, and/or other account information. The memberships may define advantages and/or limitations of user access to virtual content per membership level. The groups may be a plurality of other users in which the user may be a part of. By way of non-limiting example, the users of a group may converse, challenge each other, trade virtual content items, and/or other interactions. The preferences may include cosmetic preferences, including background colors, font, language, time zone, read receipts, username, audio accent, screen saver, notifications, and/or other preferences. The preference may include content preferences, including preferences of products, retailers, cuisine, activities, and/or other preferences. The notifications may include sounds, badges, notification previews, and/or other notifications. The usage may characterize an amount of time the user may interact with the system per day, week, month, year, and/or other period of time. The contact information may include one or more email addresses, online social platforms, phone numbers, and/or other contact information in which the user may receive updates and/or reminders.

The activity information may include location, motions, actions, orientation, and/or other activity information. Orientation may be defined by yaw angle, pitch angle, roll angle, heading, pointing direction, and/or other measurements of the user. Actions of the user may include jumps, kicks, flips, dances, speaking, and/or other actions.

Accessibility determination component 110 may be configured to compare the user information with the accessibility criteria for the virtual content to determine whether any portions of the virtual content are to be presented to the user based on the accessibility criteria and the user information for the user. The portions of the virtual content may include objects, markings on the objects, audio content, text content, annotations, capabilities of the objects, some 3D live action, the properties of the virtual content, and/or other portions of the virtual content.

Figure 6:
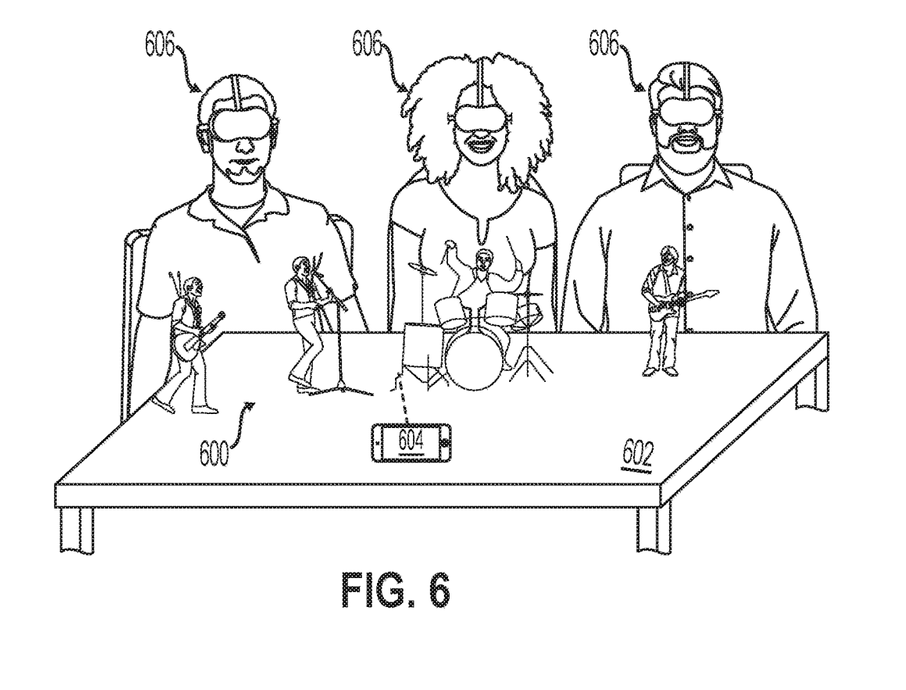
FIG. 6 illustrates an example implementation of a system configured to convey virtual content in an augmented reality environment comprising images of virtual content superimposed over physical objects and/or physical surroundings visible within a field of view of a user as if the images of the virtual content were present in the real world, in accordance with one or more implementations.

FIG. 6 illustrates an example implementation of a system configured to convey virtual content in an augmented reality environment comprising images of virtual content superimposed over physical objects and/or physical surroundings visible within a field of view of a user as if the images of the virtual content were present in the real world, in accordance with one or more implementations. FIG. 6 illustrates virtual content 600 visible by users 606 via presentation devices associated with users 606. Virtual content 600 may be of a live concert such that users 606 may watch from a different location than the location of the concert. Virtual content 600 may be presented on table top 602 based on the user proximity to marker device 604 located on table top 602. Virtual content 600 may be presented to users 606 upon comparison of accessibility criteria of virtual content 600 (e.g., viewing fee paid) and the user information of users 606.

In some implementations, the virtual content may include a first virtual content item. Accessibility determination component 110 may be configured to receive a first accessibility criterion for the first virtual content item from an administrative user. The accessibility criterion may include the first accessibility criteria. An administrative user may include, by way of non-limiting example, retailers, gaming services, leader of a group in which the user is a part of, employers, and/or others.

Accessibility determination component 110 may be configured to obtain subscription information for the user. The subscription information for the user may indicate one or more subscriptions of the user, as defined above. Accessibility determination component 110 may be configured to determine that at least one of the one or more subscriptions of the user permits access to the virtual content. The access by the user to the virtual content may be facilitated responsive to the determination that at least one of the one or more subscriptions of the user permits access to the virtual content. By way of non-limiting example, a first subscription of a first user may permit access to some virtual content items of the virtual content, while a second subscriptions of a second user may permit access to all virtual content items of the virtual content.

Presentation facilitation component 114 may be configured to facilitate presentation of the virtual content to the user via presentation device 152 of the user. Facilitation of presentation may be based on the virtual content information, a field of view of the user, the correlation between the multiple linkage points, and the reference frame of the virtual content. Presentation of the virtual content to the user may be based on the determination of access to the virtual content based on subscriptions, the user information, and/or other accessibility determinations.

In some implementations, presentation facilitation component 114 may be configured to obtain virtual content information from a sign post. The linkage points associated with the sign post may serve as an anchor for the reference frame of virtual content. For example, presentation facilitation component 114 may be configured obtain virtual content information from a sign post as described in U.S. patent application Ser. No. 15/707,854, entitled "SYSTEMS AND METHODS FOR UTILIZING A DEVICE AS A MARKER FOR AUGMENTED REALITY CONTENT," the disclosure of which is hereby incorporated by reference in its entirety herein.

Figure 3:
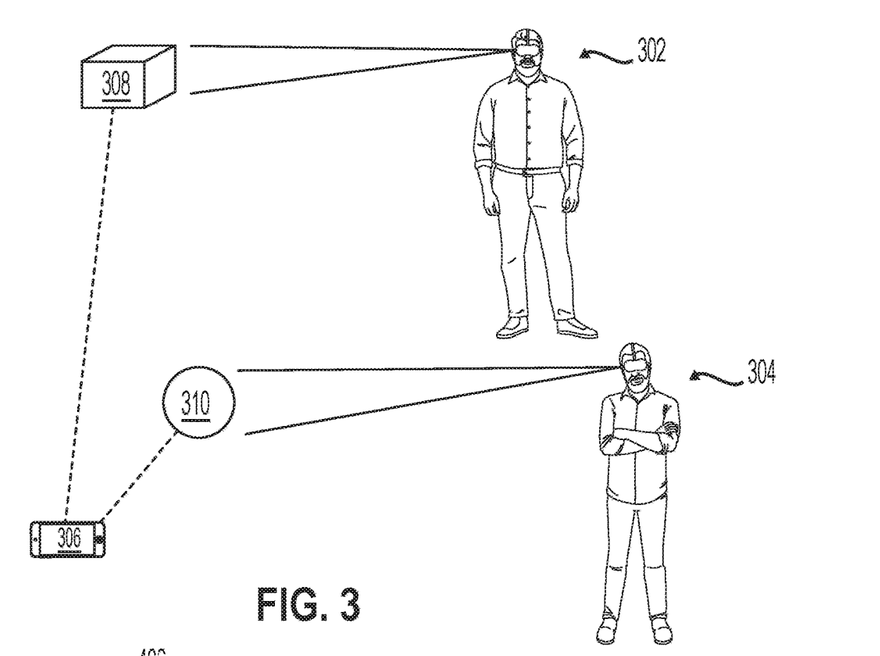
FIG. 3 illustrates an example implementation of a system configured to convey virtual content in an augmented reality environment comprising images of virtual content superimposed over physical objects and/or physical surroundings visible within a field of view of a user as if the images of the virtual content were present in the real world, in accordance with one or more implementations.

FIG. 3 illustrates an example implementation of a system configured to convey virtual content in an augmented reality environment comprising images of virtual content superimposed over physical objects and/or physical surroundings visible within a field of view of a user as if the images of the virtual content were present in the real world, in accordance with one or more implementations. FIG. 3 illustrates user 302 and user 304 in proximity to marker device 306. The demographic information of user 302 may indicate user 302 is in age range 30-39 and occupation is carpenter. The user information of user 304 may indicate user 304 has a subscription to a gaming service in which new weapons are released every month. Virtual content 308 presented to user 302 may include various virtual content items based on the user information of user 302. Virtual content 308 may include advertisements for sales at a nearby hardware store, listings for needed carpentry, jobs advertisements, and/or other virtual content. Conversely, virtual content 310 presented to user 304 may include various virtual content items based on the user information of user 304. Virtual content 310 may include a new virtual tool that may be used within proximity of marker device 306 within the gaming service.

Figure 5:
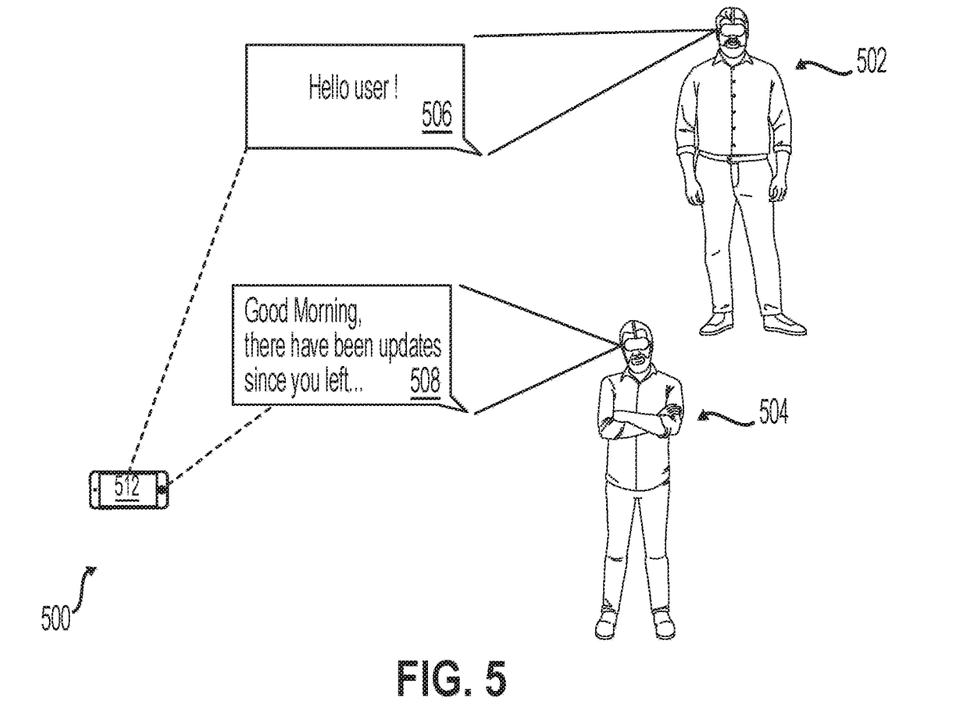
FIG. 5 illustrates an example implementation of a system configured to convey virtual content in an augmented reality environment comprising images of virtual content superimposed over physical objects and/or physical surroundings visible within a field of view of a user as if the images of the virtual content were present in the real world, in accordance with one or more implementations.

FIG. 5 illustrates an example implementation of a system configured to convey virtual content in an augmented reality environment comprising images of virtual content superimposed over physical objects and/or physical surroundings visible within a field of view of a user as if the images of the virtual content were present in the real world, in accordance with one or more implementations. FIG. 5 illustrates user 502 and user 504 in location 500. Virtual content item 506 and virtual content item 508 may be welcome messages presented to user 502 and user 504, respectively, when they enter location 500 and are in proximity to marker device 512. Based on the preferences of the account information of user 502, virtual content item 506 includes a brief welcome message. Based on the preferences of the account information of user 504, virtual content item 508 includes all updates since visit to location 500.

Presentation facilitation component 114 may be configured to facilitate presentation of the virtual content information defining the modified version of the virtual content. Presentation may be via presentation device 152 of the user and/or presentation devices of other users. The modified version of the virtual content may be based on user input indicating requests to modify the virtual content.

Presentation facilitation component 114 may be configured to cause a selectable list of the multiple virtual content items to be presented to the user. A selectable list may include the multiple virtual content items in which the user may select one or more of. The selectable list of virtual content available to be presented via presentation device 152 may include virtual content stored on or accessible via one or more devices of a user, electronic storage 142, other components of system 100, virtual content available via one or more connected devices (e.g., a device of a living entity visible within a field of view of the user, smart marker, sign post), and/or virtual content available via a network (e.g., obtainable via the Internet, stored in cloud storage, or otherwise available via a network). In some implementations, the selectable list of virtual content available to be presented via presentation device 152 may be presented upon proximity to devices of which virtual content is stored on. Selection by a user may be by physical input received via a user device, voice input, gesture-based input, input based on movement of the presentation device, input based on user eye movement, and/or one or more other types of user input.

Item receiving component 118 may be configured to receive from the administrative user an identification of a second user to invite to provide at least one virtual content item. Identification of the second user may be a display of a username, first and/or last name, visual indication (e.g., virtual arrow, virtual circle, etc.), audible indication, and/or other identifications. The user may invite the second user by one of the user inputs as previously mentioned.

Messaging component 120 may be configured to generate a message. The message may include a request to provide the at least one virtual content item. The message to the second user may include audible content, textual content, animations, live action, and/or other virtual content. Messaging component 120 may be configured to transmit the message to the second user. Messaging component 120 may be configured to generate one message or multiple messages at one time. Likewise, messaging component 120 may be configured to transmit the multiple messages at one time to multiple users. Each of the multiple messages may be customized or uniform based on the recipients of the messages (e.g., preferences).

In some implementations, the virtual content may include a second virtual content item. Item receiving component 118 may be configured to receive, from the second user, the second virtual content item responsive to a request. Receiving the second virtual content item may include receiving virtual content information defining the second virtual content item and second accessibility criteria for the second virtual content item. The accessibility criteria may include the second accessibility criteria.

In some implementations, the virtual content may include multiple virtual content items. Virtual content generator 138 may be configured to receive a selection of a first multiple virtual content item of the multiple virtual content items. Upon determination that access is permitted to the selection of the first multiple virtual content item, accessibility determination component 110 may be configured to facilitate access to the first multiple virtual content item responsive to receipt of the selection.

Figure 4:
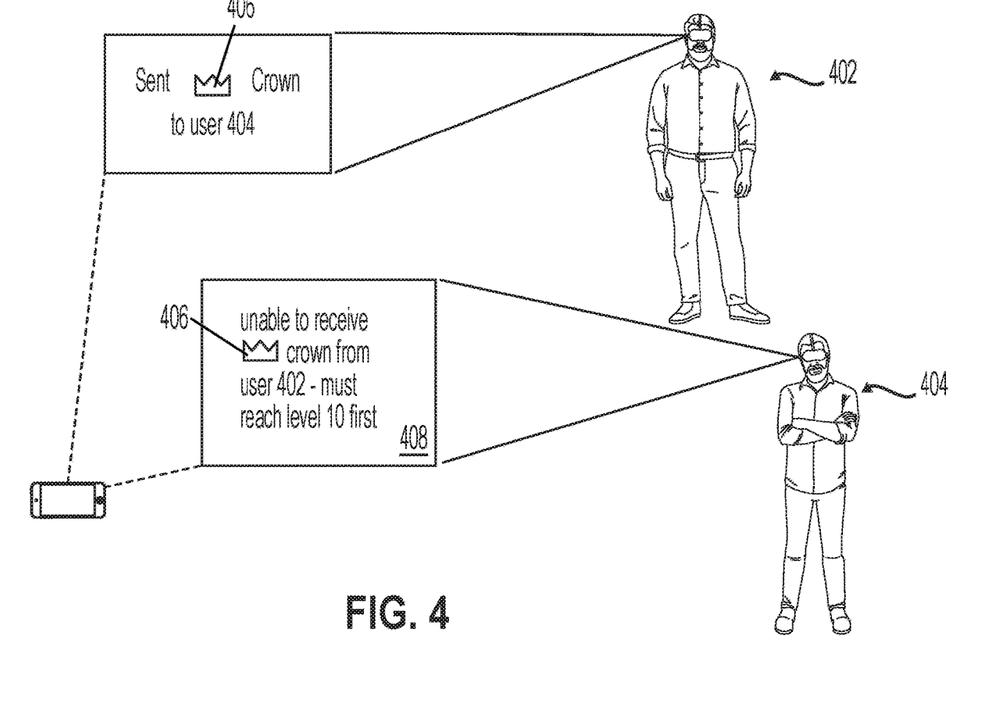
FIG. 4 illustrates an example implementation of a system configured to convey virtual content in an augmented reality environment comprising images of virtual content superimposed over physical objects and/or physical surroundings visible within a field of view of a user as if the images of the virtual content were present in the real world, in accordance with one or more implementations.

FIG. 4 illustrates an example implementation of a system configured to convey virtual content in an augmented reality environment comprising images of virtual content superimposed over physical objects and/or physical surroundings visible within a field of view of a user as if the images of the virtual content were present in the real world, in accordance with one or more implementations. FIG. 4 illustrates user 402 and user 404 both which are participates in the same gaming platform. User 402 may attempt to send virtual crown 406 to user 404. Upon determining the accessibility criteria of virtual crown 406 and user information of user 404, user 404 may receive message 408 conveying that Level 10 must be achieved before virtual crown 406 may be received.

Virtual content generator 138 may be configured to obtain user input from the user indicating a request to modify the virtual content displayed in the augmented reality environment. By way of non-limiting example, the user input may be obtained via a user interface 102 generated by user interface component 122. User input may comprise physical input received via a user device, voice input, gesture-based input, input based on movement of the presentation device, input based on user eye movement, input based on video recording of user (e.g., speaking, dancing, etc.), input based on image of user (e.g., real and/or virtual), and/or one or more other types of user input. Virtual content generator 138 may be configured to obtain user input from one or more of the other users indicating one or more requests to modify the virtual content displayed in the augmented reality environment.

Virtual content generator 138 may be configured to generate virtual content information defining a modified version of the virtual content displayed in the augmented reality environment. The modified version of the virtual content may be based on the user input of the user. Virtual content generator 138 may be configured to generate virtual content information defining a modified version of the virtual content displayed in the augmented reality environment wherein the modified version of the virtual content may be based on the user input of the other users. The user input of other users may be compared to accessibility criteria to determine if modifications may be permitted by a certain user and/or what modifications are permitted. Modifications may apply to the characteristics of the virtual content (e.g., color, transparency, textual content, size, etc.).

In some implementations, processor(s) 144, presentation device 152, electronic storage 142, and/or external resources 140 may be operatively linked user interface 102 as in FIG. 1. However, any communication medium may be used to facilitate interaction between any components of system 100. One or more components of system 100 may communicate with each other through hard-wired communication, wireless communication, or both. For example, one or more components of system 100 may communicate with each other through a network. For example, processor 142 may wirelessly communicate with electronic storage 142. By way of non-limiting example, wireless communication may include one or more of the Internet, radio communication, Bluetooth communication, Bluetooth Low Energy (BLE) communication, Wi-Fi communication, cellular communication, infrared communication, or other wireless communication. Other types of communications are contemplated by the present disclosure.

User interface component 122 may be configured to generate and cause a user interface 102 to be displayed to a user. In various implementations, the user interface may be displayed to a user via a display interface of a user device. For example, a user interface may be displayed to a user via a graphical user interface of a user device, a display of presentation device 152, or any other display interface provided via a user device and/or a component of system 100.

In various implementations, user interface component 122 may be configured to generate a user interface that provides a user with information related to system 100. For example, the information related to the system may comprise an indication of one or more connected devices (e.g., a user device such as a smartphone or presentation device, and/or other devices connectable to system 100), virtual content depicted in the augmented reality environment whether currently visible or not, virtual content available to be presented via presentation device 152 (e.g., content available via one or more devices of a user, electronic storage 142, and/or other components of system 100), an indication of a direction in which virtual content may be visible via presentation device 152 (e.g., one or more arrows depicted a direction to move the presentation device to visualize virtual content), an indication of one or more markers or linkage points visible via presentation device 152, an indication of one or more users, living entities, and/or recognizable objects visible via presentation device 152, one or more instructions for the user to trigger the rendering of virtual content in the augmented reality environment via presentation device 152, an indication of one or more other users interacting with and/or viewing virtual content, a current time and/or date, and/or other information related to system 100. In some implementations, user interface component 122 may be configured to generate a user interface that provides a user with information related to system 100 without enabling the user to provide input via the user interface.

In various implementations, user interface component 122 may be configured to generate a user interface that provides a user with information related to system 100 and enables a user to provide input. For example, the user interface may comprise selectable icons, input fields, and/or other user input options enabling a user to control one or more aspects of system 100. In some implementations, user interface component 122 may be configured to generate a user interface that enables a user to modify virtual content information for virtual content based on one or more types of user input. For example, a user interface generated by user interface component 122 may be configured to receive requests, and subsequently virtual content generator 138 may be configured to receive the requests, to modify virtual content displayed via presentation device 152. Requests to modify virtual content may comprise requests to modify (i.e., alter) virtual content currently displayed via presentation device 152 and/or requests to swap out the virtual content rendered in an augmented reality environment for other virtual content. In some implementations, user interface component 122 may be configured to generate and provide to a user an interface that may receive requests to render virtual content and/or modify virtual content while virtual content is simultaneously rendered in the augmented reality environment via presentation device 152. In some implementations, user interface component 122 may be configured to generate a user interface that enables a user to request the removal of virtual content rendered in the augmented reality environment.

In various implementations, user interface component 122 may be configured to generate a user interface that provides an indication of the virtual content available to be presented via presentation device 152.

External resources 140 may include sources of information outside of system 100, external entities participating with system 100, and/or other resources. In some implementations, some or all of the functionality attributed herein to external resources 140 may be provided by resources included in system 100.

Electronic storage 142 may comprise non-transitory storage media that electronically stores information. The electronic storage media of electronic storage 142 may be provided integrally (i.e., substantially non-removable) with one or more components of system 100 and/or removable storage that is removably connectable to system 100 via, for example, by a port (e.g., a USB port, a firewire port, etc.) or a drive (e.g., a disk drive, etc.). Electronic storage 142 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 142 may include one or more virtual storage resources (e.g., cloud storage, a virtual private network, and/or other virtual storage resources). Although electronic storage 142 is shown in FIG. 1 as a single entity, this is for illustrative purposes only. In some implementations, electronic storage 142 may comprise multiple storage units. These storage units may be physically located within the same device, or electronic storage 130 may represent storage functionality of multiple devices operating in coordination.

Electronic storage 142 may store software algorithms, information determined by processor(s) 144, information received remotely, and/or other information that enables system 100 to function as described herein.

Although processor(s) 144 is shown in FIG. 1 as a single entity, this is for illustrative purposes only. In some implementations, processor(s) 144 may include a plurality of processing units. These processing units may be physically located within the same device, or processor(s) 144 may represent processing functionality of a plurality of devices operating in coordination. Processor(s) 144 may be configured to execute components 110, 114, 118, 120, 122, and/or 138, and/or other components. Processor(s) 144 may be configured to execute components 110, 114, 118, 120, 122, and/or 138, and/or other components by software; hardware; firmware; some combination of software, hardware, and/or firmware; and/or other mechanisms for configuring processing capabilities on processor(s) 144. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 114, 118, 120, 122, and/or 138 are illustrated in FIG. 1 as being implemented within a single processing unit, in implementations in which processor(s) 144 includes multiple processing units, one or more of components 110, 114, 118, 120, 122, and/or 138 may be implemented remotely from the other components. The description of the functionality provided by the different components 110, 114, 118, 120, 122, and/or 138 described below is for illustrative purposes, and is not intended to be limiting, as any of components 110, 114, 118, 120, 122, and/or 138 may provide more or less functionality than is described. For example, one or more of components 110, 114, 118, 120, 122, and/or 138 may be eliminated, and some or all of its functionality may be provided by other ones of components 110, 114, 118, 120, 122, and/or 138. As another example, processor(s) 144 may be configured to execute one or more additional components that may perform some or all of the functionality attributed below to one of components 110, 114, 118, 120, 122, and/or 138.

Figure 2:
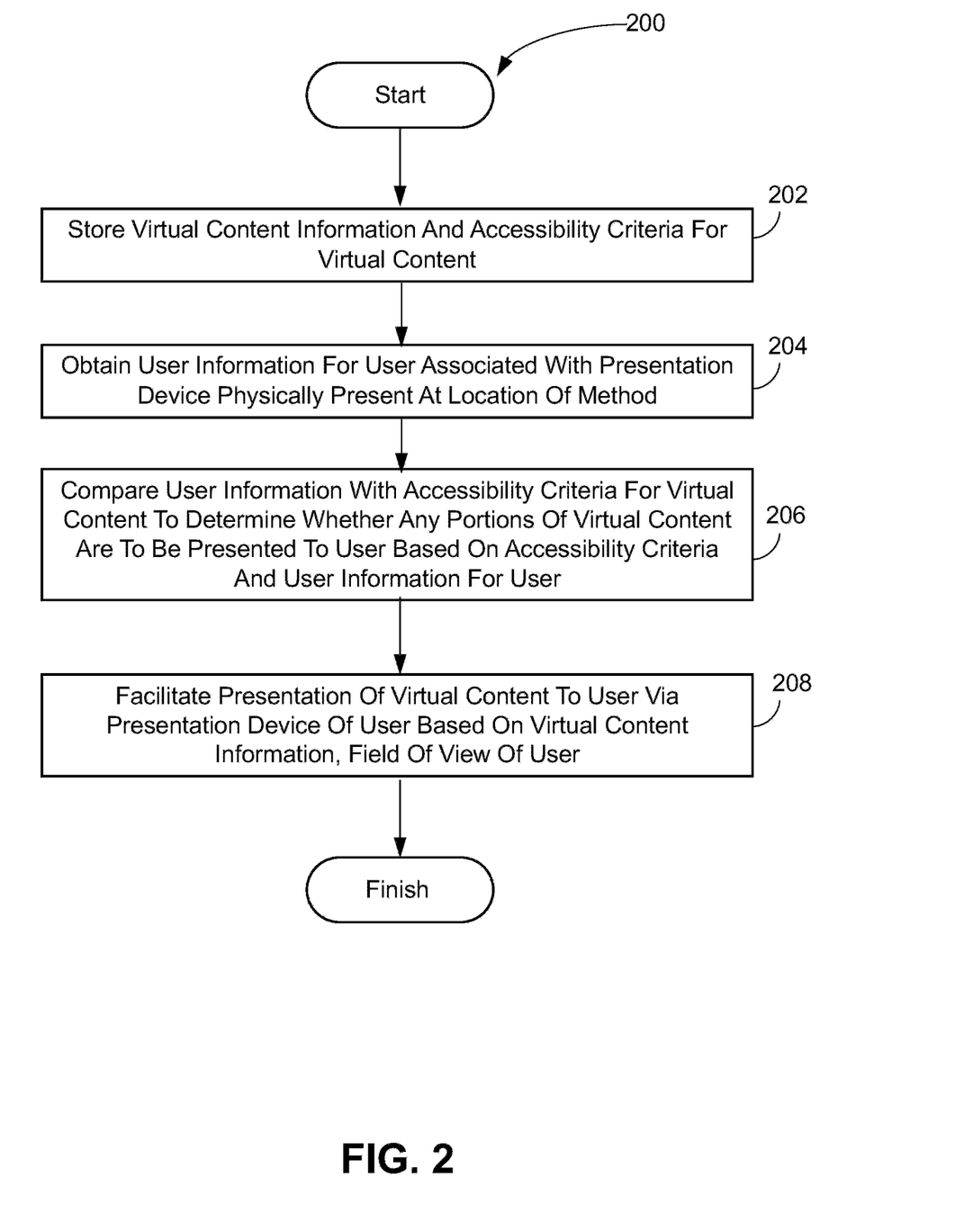
FIG. 2 illustrates a method for conveying virtual content in an augmented reality environment comprising images of virtual content superimposed over physical objects and/or physical surroundings visible within a field of view of a user as if the images of the virtual content were present in the real world, wherein the augmented reality environment includes the physical objects and/or the physical surroundings visible within the field of view of the user and images of virtual content presented in conjunction with the physical objects and/or the physical surroundings, in accordance with one or more implementations.

FIG. 2 illustrates a method 200 for conveying virtual content in an augmented reality environment comprising images of virtual content superimposed over physical objects and/or physical surroundings visible within a field of view of a user as if the images of the virtual content were present in the real world, wherein the augmented reality environment includes the physical objects and/or the physical surroundings visible within the field of view of the user and images of virtual content presented in conjunction with the physical objects and/or the physical surroundings, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing virtual content information and accessibility criteria for the virtual content. Operation 202 may be performed by one or more hardware processors configured by machine-readable instructions including a component that is the same as or similar to electronic storage 142, in accordance with one or more implementations.

An operation 204 may include obtaining user information for a user associated with a presentation device physically present at a location of the method. Operation 204 may be performed by one or more hardware processors configured by machine-readable instructions including a component that is the same as or similar to accessibility determination component 110, in accordance with one or more implementations.

An operation 206 may include comparing the user information with the accessibility criteria for the virtual content to determine whether any portions of the virtual content are to be presented to the user based on the accessibility criteria and the user information for the user. Operation 206 may be performed by one or more hardware processors configured by machine-readable instructions including a component that is the same as or similar to accessibility determination component 110, in accordance with one or more implementations.

An operation 208 may include facilitating presentation of the virtual content to the user via the presentation device of the user based on the virtual content information, a field of view of the user. The correlation between the multiple linkage points and the reference frame of the virtual content. Operation 208 may be performed by one or more hardware processors configured by machine-readable instructions including a component that is the same as or similar to presentation facilitation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to convey virtual content in an augmented reality environment comprising images of virtual content superimposed over physical objects and/or physical surroundings visible within a field of view of a user as if the images of the virtual content were present in the real world, wherein the augmented reality environment includes (i) the physical objects and/or the physical surroundings visible within the field of view of the user and (ii) the images of virtual content presented in conjunction with the physical objects and/or the physical surroundings, the system comprising:

electronic storage that (i) stores virtual content information defining virtual content correlations between multiple linkage points and a reference frame of the virtual content, wherein relative positions of the multiple linkage points in the real world define the reference frame with respect to the real world, and (ii) accessibility criteria for the virtual content, wherein the virtual content includes a first virtual content item; and one or more physical computer processors configured by computer-readable instructions to:

obtain user information for a user associated with a presentation device physically present at a location of the system, wherein the user information for the user identifies the user associated with the presentation device and/or the presentation device;

compare the user information with the accessibility criteria for the virtual content to determine whether any portions of the virtual content are to be presented to the user based on the accessibility criteria and the user information for the user;

facilitate presentation of the virtual content to the user via the presentation device of the user based on the virtual content information, a field of view of the user, the correlation between the multiple linkage points and the reference frame of the virtual content, and the comparison of the user information with the accessibility criteria; and receive a first accessibility criterion for the first virtual content item from an administrative user, wherein the accessibility criteria include the first accessibility criterion.

2. The system of claim 1, wherein the virtual content includes a second virtual content item, and wherein the one or more processors are further configured to:

receive from the administrative user an identification of a second user to invite to provide at least one virtual content item;

generate a message comprising a request to provide the at least one virtual content item;

transmit the message to the second user; and receive, from the second user, the second virtual content item responsive to the request, wherein receiving the second virtual content item comprises receiving (i) virtual content information defining the second virtual content item and (ii) second accessibility criterion for the second virtual content item, wherein the accessibility criteria includes the second accessibility criterion.

3. The system of claim 1, wherein the virtual content comprises one or more virtual content items, and wherein the accessibility criteria defines preferences associated with displaying individual virtual content items of the one or more virtual content items and/or conditions that must be satisfied to display the individual virtual content items of the one or more virtual content items.

4. The system of claim 1, wherein the accessibility criteria indicate a subscription required to access the virtual content, wherein the one or more processors are further configured to:

obtain subscription information for the user, wherein the subscription information for the user indicates one or more subscriptions of the user; and determine that at least one of the one or more subscriptions of the user permits access to the virtual content, wherein the access by the user to the virtual content is facilitated responsive to the determination that at least one of the one or more subscriptions of the user permits access to the virtual content.

5. The system of claim 1, wherein the virtual content comprises multiple virtual content items, wherein the one or more processors are further configured to:

cause a selectable list of the multiple virtual content items to be presented to the user;

receive a selection of a first multiple virtual content item of the multiple virtual content items; and facilitate access to the first multiple virtual content item responsive to receipt of the selection.

6. The system of claim 1, wherein the one or more processors are further configured to:

obtain user input from the user indicating a request to modify the virtual content displayed in the augmented reality environment;

generate virtual content information defining a modified version of the virtual content displayed in the augmented reality environment based on the user input; and facilitate presentation of the virtual content information defining the modified version of the virtual content via the presentation device of the user and/or presentation devices of other users.

7. The system of claim 6, wherein the one or more processors are further configured to:

obtain user input from one or more of the other users indicating one or more requests to modify the virtual content displayed in the augmented reality environment; and generate virtual content information defining a modified version of the virtual content displayed in the augmented reality environment based on the user input of the other users.

8. The system of claim 1, wherein the virtual content information defines characteristics of the virtual content, the characteristics comprising one or more of a visual appearance of the virtual content, one or more actions of the virtual content, textual and/or audible content of the virtual content, and customizable features of the virtual content.

9. A method for conveying virtual content in an augmented reality environment comprising images of virtual content superimposed over physical objects and/or physical surroundings visible within a field of view of a user as if the images of the virtual content were present in the real world, wherein the augmented reality environment includes (i) the physical objects and/or the physical surroundings visible within the field of view of the user and (ii) the images of virtual content presented in conjunction with the physical objects and/or the physical surroundings, the method comprising:

storing (i) virtual content information defining virtual content correlations between multiple linkage points and a reference frame of the virtual content, wherein relative positions of the multiple linkage points in the real world define the reference frame with respect to the real world, and (ii) accessibility criteria for the virtual content, wherein the virtual content includes a first virtual content item;

obtaining user information for a user associated with a presentation device physically present at a location of the method, wherein the user information for the user identifies the user associated with the presentation device and/or the presentation device;

comparing the user information with the accessibility criteria for the virtual content to determine whether any portions of the virtual content are to be presented to the user based on the accessibility criteria and the user information for the user;

facilitating presentation of the virtual content to the user via the presentation device of the user based on the virtual content information, a field of view of the user, the correlation between the multiple linkage points and the reference frame of the virtual content, and the comparison of the user information with the accessibility criteria; and receiving a first accessibility criterion for the first virtual content item from an administrative user, wherein the accessibility criteria include the first accessibility criterion.

10. The method of claim 9, wherein the virtual content includes a second virtual content item, and the method further comprising:

receiving from the administrative user an identification of a second user to invite to provide at least one virtual content item;

generating a message comprising a request to provide the at least one virtual content item;

transmitting the message to the second user; and receiving, from the second user, the second virtual content item responsive to the request, wherein receiving the second virtual content item comprises receiving (i) virtual content information defining the second virtual content item and (ii) second accessibility criterion for the second virtual content item, wherein the accessibility criteria includes the second accessibility criterion.

11. The method of claim 9, wherein the virtual content comprises one or more virtual content items, and wherein the accessibility criteria defines preferences associated with displaying individual virtual content items of the one or more virtual content items and/or conditions that must be satisfied to display the individual virtual content items of the one or more virtual content items.

12. The method of claim 9, wherein the accessibility criteria indicate a subscription required to access the virtual content, the method further comprising:
   obtaining subscription information for the user, wherein the subscription information for the user indicates one or more subscriptions of the user; and
   determining that at least one of the one or more subscriptions of the user permits access to the virtual content, wherein the access by the user to the virtual content is facilitated responsive to the determination that at least one of the one or more subscriptions of the user permits access to the virtual content.

13. The method of claim 9, wherein the virtual content comprises multiple virtual content items, the method further comprising:
   causing a selectable list of the multiple virtual content items to be presented to the user;
   receiving a selection of a first multiple virtual content item of the multiple virtual content items; and
   facilitating access to the first multiple virtual content item responsive to receipt of the selection.

14. The method of claim 9, the method further comprising:
   obtaining user input from the user indicating a request to modify the virtual content displayed in the augmented reality environment;
   generating virtual content information defining a modified version of the virtual content displayed in the augmented reality environment based on the user input; and
   facilitating presentation of the virtual content information defining the modified version of the virtual content via the presentation device of the user and/or presentation devices of other users.

15. The method of claim 14, the method further comprising:
   obtaining user input from one or more of the other users indicating one or more requests to modify the virtual content displayed in the augmented reality environment; and
   generating virtual content information defining a modified version of the virtual content displayed in the augmented reality environment based on the user input of the other users.

16. The method of claim 9, wherein the virtual content information defines characteristics of the virtual content, the characteristics comprising one or more of a visual appearance of the virtual content, one or more actions of the virtual content, textual and/or audible content of the virtual content, and customizable features of the virtual content.

* * * * *